US012071809B2

(12) United States Patent
Lee

(10) Patent No.: US 12,071,809 B2
(45) Date of Patent: Aug. 27, 2024

(54) UNIVERSAL SEAL FOR A MOVABLE BARRIER

(71) Applicant: Overhead Door Corporation, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 17/885,922

(22) Filed: Aug. 11, 2022

(65) Prior Publication Data

US 2024/0052690 A1 Feb. 15, 2024

(51) Int. Cl.
*E06B 7/23* (2006.01)

(52) U.S. Cl.
CPC ............ *E06B 7/231* (2013.01); *E06B 7/2316* (2013.01)

(58) Field of Classification Search
CPC ......... E06B 7/231; E06B 7/2316; E06B 9/582
USPC ..................................... 49/489.1, 496.1, 125
See application file for complete search history.

(56) References Cited

U.S. PATENT DOCUMENTS

| | | | | | |
|---|---|---|---|---|---|
| 1,590,974 | A * | 6/1926 | John | E06B 7/2309 | 49/498.1 |
| 2,663,057 | A * | 12/1953 | Uphoff | E06B 7/2316 | 49/470 |
| 2,934,802 | A * | 5/1960 | Shekter | E06B 7/2316 | 49/470 |
| 2,949,651 | A * | 8/1960 | Hill | E06B 7/2316 | 49/470 |
| 3,254,453 | A * | 6/1966 | Dennis | E06B 7/2316 | 49/482.1 |
| 3,324,598 | A * | 6/1967 | Tinfow | E06B 7/2316 | 52/468 |
| 3,374,580 | A * | 3/1968 | Ruff | E06B 7/2318 | 49/470 |
| 3,411,246 | A * | 11/1968 | Miller | E06B 7/28 | 49/499.1 |
| 3,871,133 | A * | 3/1975 | Ellingson, Jr. | E06B 7/2316 | 49/470 |
| 4,015,368 | A * | 4/1977 | Court | B60J 10/86 | 49/495.1 |
| 4,049,311 | A * | 9/1977 | Dietrich | B60P 7/14 | 410/139 |

(Continued)

FOREIGN PATENT DOCUMENTS

| | | | | |
|---|---|---|---|---|
| BE | 821911 | A * | 5/1975 | E06B 7/231 |
| BE | 894165 | A * | 12/1982 | E06B 7/231 |

(Continued)

OTHER PUBLICATIONS

Amarr, Installation Instructions, Commercial Sectional Doors, Form #161 Rev. 12/20, pp. 1-46.

(Continued)

*Primary Examiner* — Marcus Menezes
(74) *Attorney, Agent, or Firm* — Haynes and Boone, LLP

(57) ABSTRACT

A flexible seal may be attachable to a moveable barrier and usable to seal selectively along a horizontal surface adjacent the moveable barrier and along a vertical surface adjacent the moveable barrier. The flexible seal may assume a first orientation to be affixed to a lower edge of the movable barrier and may assume a second orientation to be affixed to an upper edge of the movable barrier.

11 Claims, 9 Drawing Sheets

(56) References Cited

U.S. PATENT DOCUMENTS

| | | | | | |
|---|---|---|---|---|---|
| 4,185,417 | A * | 1/1980 | McKann | E06B 7/2316 49/470 |
| 4,571,889 | A * | 2/1986 | Labelle | E06B 9/17046 49/499.1 |
| 4,599,825 | A * | 7/1986 | Sixsmith | E06B 7/231 49/499.1 |
| 5,396,735 | A * | 3/1995 | Dietrich | E06B 7/2316 49/499.1 |
| 5,435,104 | A * | 7/1995 | Dietrich | B60J 10/84 49/475.1 |
| 5,581,951 | A * | 12/1996 | Ryan | E06B 7/2309 49/489.1 |
| 6,263,948 | B1 * | 7/2001 | Whitley | E05D 15/165 160/193 |
| 6,478,308 | B1 * | 11/2002 | McMillin | B60J 10/86 49/495.1 |
| 6,484,447 | B1 * | 11/2002 | Snyder | E06B 3/485 160/40 |
| 8,726,575 | B1 * | 5/2014 | Vulpitta | E06B 7/2314 49/470 |
| 9,745,798 | B2 * | 8/2017 | Preising, Jr. | E06B 7/2314 |
| 11,391,086 | B2 * | 7/2022 | Webb | E06B 7/2303 |
| 2003/0111187 | A1 * | 6/2003 | Brunk | E06B 7/2309 160/40 |
| 2005/0086868 | A1 * | 4/2005 | Santelli, Jr. | E06B 7/2316 49/499.1 |
| 2012/0079771 | A1 * | 4/2012 | Meulemans | E06B 7/2305 49/492.1 |
| 2016/0029616 | A1 * | 2/2016 | Johnston | A01M 29/30 43/132.1 |
| 2017/0130522 | A1 * | 5/2017 | Lewan | F25D 23/087 |
| 2018/0119483 | A1 * | 5/2018 | Kendall | E06B 7/22 |
| 2019/0145159 | A1 * | 5/2019 | Ohrstrom | E06B 7/2316 49/470 |
| 2021/0102425 | A1 * | 4/2021 | Webb | E06B 3/485 |
| 2022/0081964 | A1 * | 3/2022 | Stoesser | E06B 7/2309 |
| 2023/0116258 | A1 * | 4/2023 | Wright | E06B 7/2307 49/493.1 |
| 2023/0175315 | A1 * | 6/2023 | Patock | E06B 7/2316 49/475.1 |

FOREIGN PATENT DOCUMENTS

| | | | | |
|---|---|---|---|---|
| DE | 202012100878 | U9 * | 9/2012 | E06B 7/2309 |
| DE | 102016008308 | A1 * | 1/2018 | E06B 3/48 |
| DE | 102017112254 | A1 * | 12/2018 | |
| EP | 3508680 | A1 * | 7/2019 | |
| GB | 1379702 | A * | 1/1975 | E06B 7/18 |
| WO | WO-9408124 | A1 * | 4/1994 | E06B 7/231 |

OTHER PUBLICATIONS

C.H.I. Overhead Doors, Installation Instructions for Commercial Steel Garage Doors, 2002, pp. 1-40.
Garaga, Installation Manual, Nov. 2021, pp. 1-24.
Horman, Installation Instructions & Owner's Manual, Hormann Sectional Garage Doors with Standard Track, H/(Issue 05.18, print 05.18) May 2018, pp. 1-32.
Ideal Door, Commercial & Industrial Sectional Doors, Installation & Maintenance, 2019, 013007-R02-0219, pp. 1-28.
Northwest Door, Inc., Garage Door Installation Instructions, VS1.1 1-03-SL, 14 pages.
Wayne Dalton, Aluminum Full View Models 464, 451, 452, Torsion Commercial Standard Lift Installation Instructions and Owner's Manual, Rev12_01/04/2021, 26 pages.

* cited by examiner

UNIVERSAL SEAL FOR A MOVABLE BARRIER

TECHNICAL FIELD

The present disclosure relates generally to the field of seals for use on movable barriers. In particular, the present disclosure relates to a universal seal attachable to a lower edge of a movable barrier in one orientation and attachable to an upper edge of a movable barrier in another orientation.

BACKGROUND

Movable barriers, such as upward-acting sectional or single panel garage doors, residential and commercial rollup doors, and slidable and swingable gates, are used to alternatively allow and restrict entry to building structures and property. Some movable barriers seal an interior from an exterior of the movable barrier. This may help to maintain a desired temperature of the interior, prevent pests from entering the interior, or serve other purposes. To seal the interior, movable barriers typically include various seals around a perimeter of the movable barrier. Such seals may be configured to close gaps between the movable barrier and an outside frame of the movable barrier.

Because different sides of the movable barrier are configured to contact different surfaces of the frame or floor, different seals are used. For example, along a lower edge of the movable barrier, a seal may be configured to contact the ground to prevent air or pests from passing beneath the movable barrier in a closed position. Along an upper edge of the movable barrier, a seal may be configured to contact a wall or frame of the opening, preventing air or pests from passing over the movable barrier. Due to the different surfaces which the upper seal and the lower seal must contact to form a seal, the upper seal and lower seal are typically two different components, each uniquely designed to form a seal with the respective contacting surfaces. However, more unique components of the movable barrier system results in increased manufacturing, servicing, and/or inventory costs and complexity.

SUMMARY

In an example aspect, the present disclosure is directed to a a flexible seal for a movable barrier. The flexible seal may include a first end, a second end, and a central region extending between the first end and the second end, the central region comprising a first surface and an opposite second surface; a first protrusion at the first end; a second protrusion at the second end; and a third protrusion extending from the first surface of the central region, wherein, when the flexible seal is in a first configuration, the flexible seal is affixable to a lower edge of the movable barrier to seal along the lower edge of the movable barrier, and wherein, when the flexible elongate member is in a second configuration, the flexible elongate member is affixable to an upper edge of the movable barrier to seal along the upper edge of the movable barrier.

In some aspects, when the flexible seal is in the first configuration, the first protrusion is receivable within a first groove of the lower edge of the movable barrier and the second protrusion is receivable within a second groove of the lower edge of the movable barrier. In some aspects, when the flexible seal is in the first configuration, the flexible seal forms an arc. In some aspects, when the flexible seal is in the first configuration, the second surface of the flexible seal face outward and the first surface and third protrusion face inward toward the lower edge of the movable barrier. In some aspects, when the flexible seal is in the first configuration, the second surface contacts a structure to seal along the lower edge of the movable barrier. In some aspects, the second surface of the flexible seal comprises one or more ridges extending parallel to the movable barrier. In some aspects, when the flexible seal is in the second configuration, the second protrusion is receivable within a first groove of the upper edge of the movable barrier and the third protrusion is receivable within a second groove of the upper edge of the movable barrier. In some aspects, when the flexible seal is in the second configuration, the first protrusion extends outward in a transverse direction from the movable barrier. In some aspects, when the flexible seal is in the second configuration, the second surface is exposed outward, a first portion of the first surface between the second protrusion and the third protrusion faces inward toward the upper edge of the movable barrier, and a second portion of the first surface between the first protrusion and the third protrusion is exposed. In some aspects, when the flexible seal is in the second configuration, the second portion of the first surface is configured to contact a structure to seal along the upper edge of the movable barrier. In some aspects, a thickness of the flexible seal between the first protrusion and the third protrusion is greater than a thickness of the flexible seal between the third protrusion and the second protrusion.

In an example aspect, the present disclosure is directed to a movable barrier system. The movable barrier may include a movable barrier comprising a lower edge and an upper edge; a member flexible between a first orientation and a second orientation, the member configured to seal along the lower edge when in the first orientation and configured to seal along the upper edge when in the second orientation.

In some aspects, the flexible member is a strip. In some aspects, the lower edge of the movable barrier comprises grooves configured to receive ends of the flexible member. In some aspects, the upper edge of the movable barrier comprises grooves configured to receive ends of the flexible member. In some aspects, the flexible member comprises: a first protrusion at a first end of the flexible member; a second protrusion at a second end of the flexible member; a third protrusion extending from a central region of the flexible member. In some aspects, the flexible member is slidably couplable to the lower edge in the first orientation by positioning the first protrusion within a first groove of the lower edge and positioning the second protrusion within a second groove of the lower edge. In some aspects, the flexible member is slidably couplable to the upper edge in the second orientation by positioning the second protrusion within a first groove of the upper edge and positioning the third protrusion within a second groove of the upper edge.

In an example aspect, the present disclosure is directed to a flexible elongate member for sealing edges of a movable barrier. The flexible elongate member may include a first protrusion; a second protrusion; and a third protrusion, wherein the flexible elongate member is selectively affixable to: a lower edge of the movable barrier by coupling the first protrusion and the second protrusion of the flexible elongate member to a lower edge of the movable barrier, the flexible elongate member forming a lower seal of the movable barrier when the movable barrier is in a closed position; and an upper edge of the movable barrier by coupling the second protrusion and the third protrusion of the flexible seal to the upper edge of the movable barrier, the flexible seal forming an upper seal of the movable barrier when the movable barrier is in a closed position.

In some aspects, the flexible elongate member comprises a first surface and a second surface, the first surface being configured to contact a first structure to form the lower seal and the second surface being configured to contact a second structure to form the upper seal.

In an example, the present disclosure is directed to a flexible seal. The flexible seal may be attachable to a moveable barrier and usable to seal selectively along a horizontal surface adjacent the moveable barrier and along a vertical surface adjacent the moveable barrier.

In some aspects, the seal is configured to project downwardly from a lower edge of the barrier to seal selectively along the horizontal surface. In some aspects, the seal is configured to laterally from an upper edge of the barrier to seal selectively along the vertical surface. In some aspects, the seal is configured to laterally from an upper edge of the barrier to seal selectively along the vertical surface.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
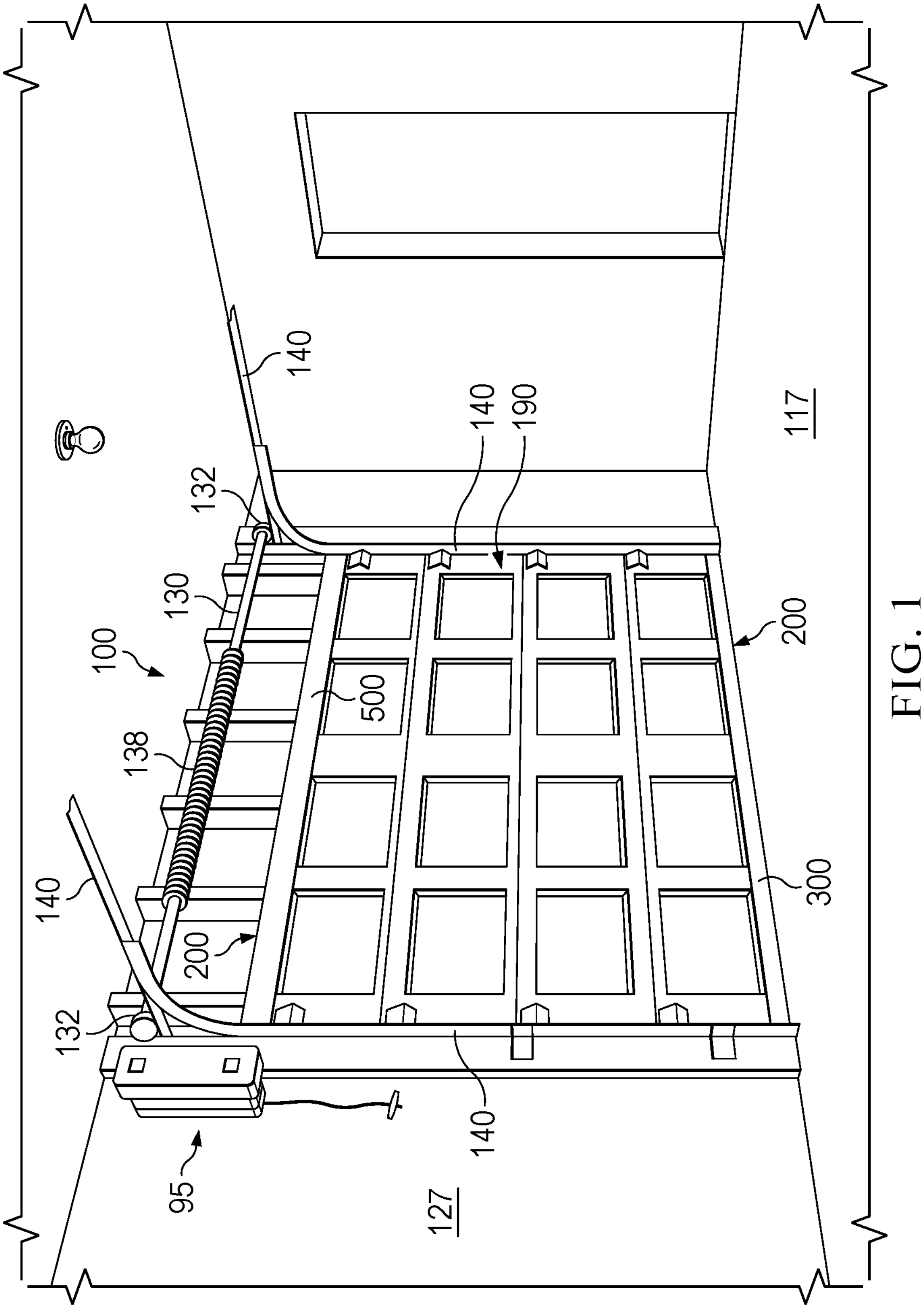
FIG. 1 is a perspective illustration of a movable barrier system, according to aspects of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, a flexible seal may be positioned along the lower edge of a movable barrier to create a seal between one surface and the movable barrier. The same flexible seal may be positioned along the upper edge of the movable barrier to create a seal between another surface and the movable barrier. In some aspects, the flexible seal may assume different orientations and/or positions at these different locations. The flexible seal may include three protrusions. Two of the three protrusions may be positioned within two corresponding grooves along the lower edge of the movable barrier. Two of the three protrusions may be positioned within two corresponding grooves along the upper edge of the movable barrier. In some aspects, the two protrusions used for the lower edge and the two protrusions used for the upper edge may include one common protrusion.

FIG. 1 is a perspective illustration of a movable barrier system 100, according to aspects of the present disclosure. FIG. 1 illustrates a movable barrier 190 and a barrier operator 95. In this example, the movable barrier 190 may be an upward acting garage door. In some examples, the movable barrier 190 may be a sectional-type garage door. The movable barrier 190 may include various panels including opaque, transparent, or semi-transparent panels.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term.

FIG. 1 shows that the movable barrier 190 provides access to a space or a room having a floor 117. The movable barrier 190 may provide selective access to the space. In the closed position shown in FIG. 1, the movable barrier 190 may be positioned within an opening of a wall 127. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the wall 127. However, the barrier operator 95 may be positioned at any other location within the room shown in FIG. 1. For example, the barrier operator 95 may be affixed to the ceiling. In some implementations, the barrier operator 95 may be positioned on a different wall of the room or on the floor 117 of the room. In some implementations, particularly in an implementation in which the barrier operator 95 is affixed or otherwise positioned on the ceiling of the room, the light fixture shown may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall 127 shown in FIG. 1 and/or the ceiling. In some implementations, the movable barrier 190 may include one or more rolling or sliding components on either side sized and shaped to fit within and move in a longitudinal direction along the tracks 140. The rolling or sliding components may be affixed to brackets positioned on either side of the movable barrier 190.

Components of the barrier system 100 shown in FIG. 1 may include any other suitable components. For example, the barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

In some aspects, the movable barrier system 100 may additionally include flexible seals 200 positioned along a bottom and a top edge of the movable barrier 190. For example, the movable barrier 190 may include multiple horizontal rails. A lower rail 300 is shown in FIG. 1 as well as an upper rail 500. In some aspects, and as will be explained in greater detail herein, a lower edge of the rail 300 may be configured to receive a flexible seal 200 and hold the flexible seal 200 in place. The flexible seal 200 positioned along the lower edge of the movable barrier 190, may help reduce or prevent passage of air between the interior space of the movable barrier system 100 and the exterior through gaps beneath the movable barrier 190. In addition, the flexible seal 200 may act as a cushion preventing damage to either the movable barrier 190, the floor 117, or other obstacle in the doorway when the movable barrier with the seal 200 is moving downward toward a closed position.

Figure 3A:
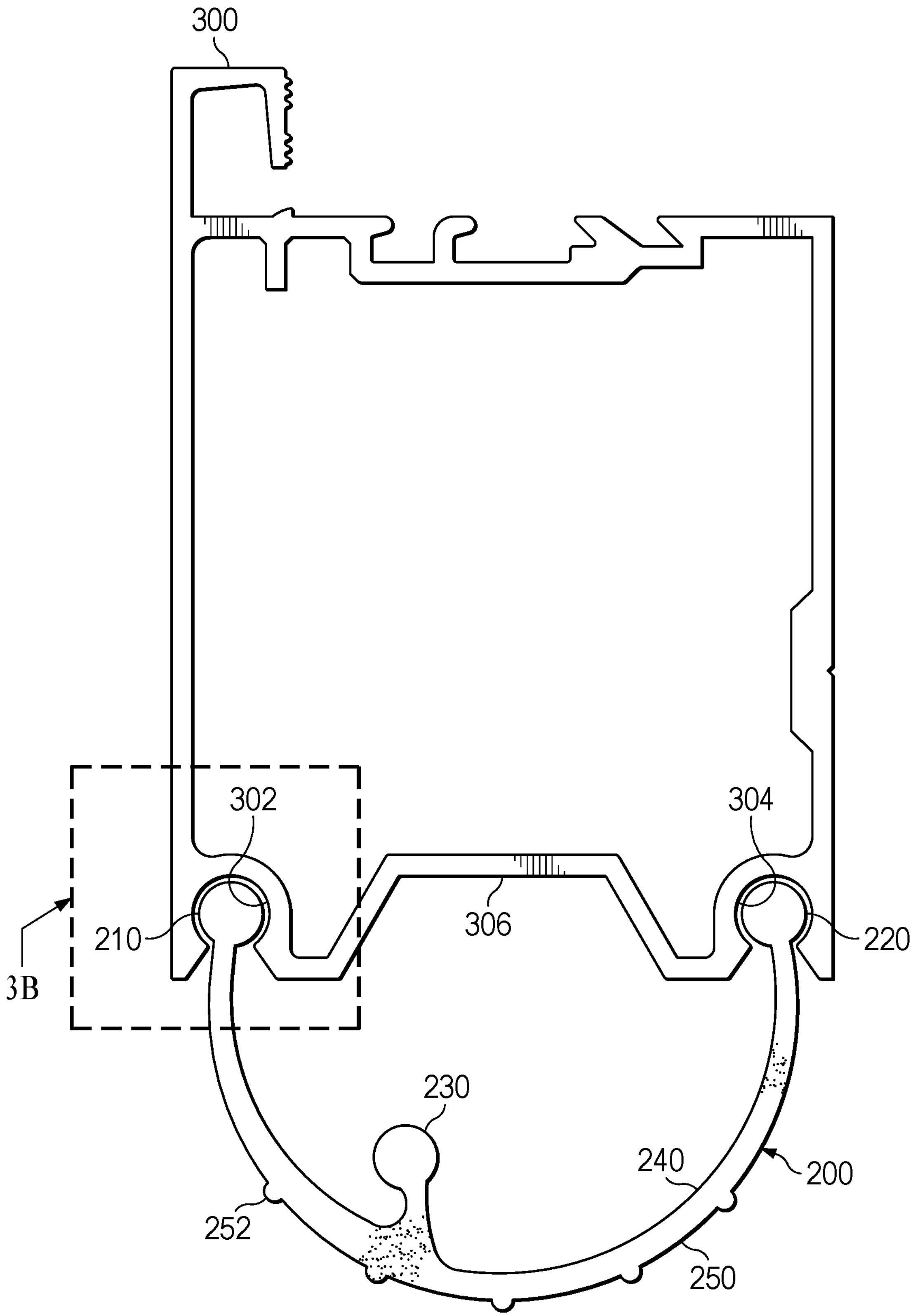
FIG. 3A is a side view of a flexible seal affixed to a lower rail of a movable barrier, according to aspects of the present disclosure.
Figure 5:
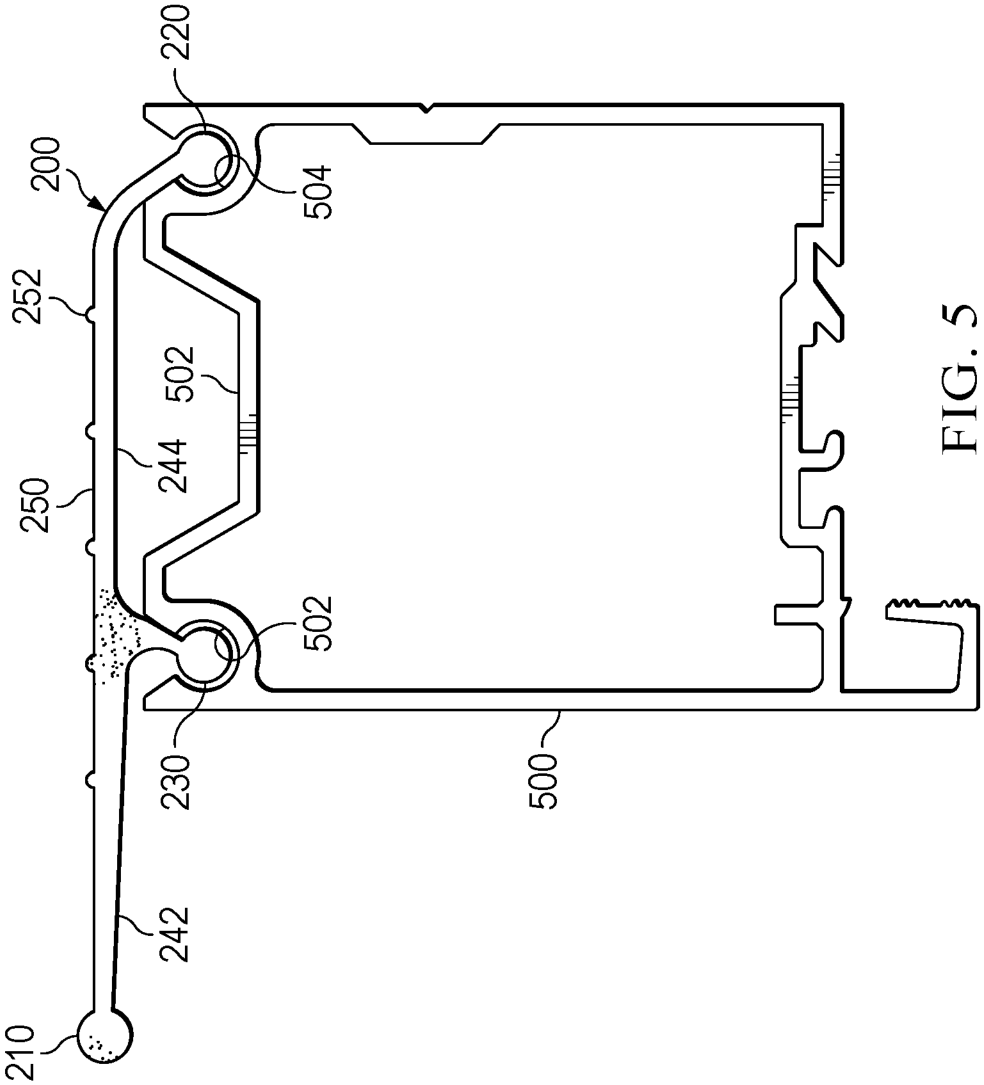
FIG. 5 is a side view of a flexible seal affixed to an upper rail of a movable barrier, according to aspects of the present disclosure.

Similarly, an upper edge of the rail 500 may be configured to receive another flexible seal 200 and hold the flexible seal 200 in place. The flexible seal 200 positioned along the upper edge of the movable barrier 190 may reduce or prevent air from passing between the interior space of the movable barrier system 100 and the exterior through gaps above the movable barrier 190 or between the movable barrier 190 and the wall 127. In addition, the flexible seal 200 may act as a cushion preventing damage to either the movable barrier 190 or the wall 127 when the two come in contact in a closed position. As will be explained in more detail hereafter, the flexible seal 200 positioned along the lower edge of the movable barrier 190 may be identical to the flexible seal positioned along the upper edge of the movable barrier 190. In some aspects, the seal 200 may assume a first position, orientation, or configuration (e.g., as shown in FIG. 3A) to be affixed to the lower edge of the movable barrier 190 and may assume a second position, orientation, or configuration (e.g., as shown in FIG. 5) to be affixed to the upper edge of the movable barrier 190.

Figure 2:
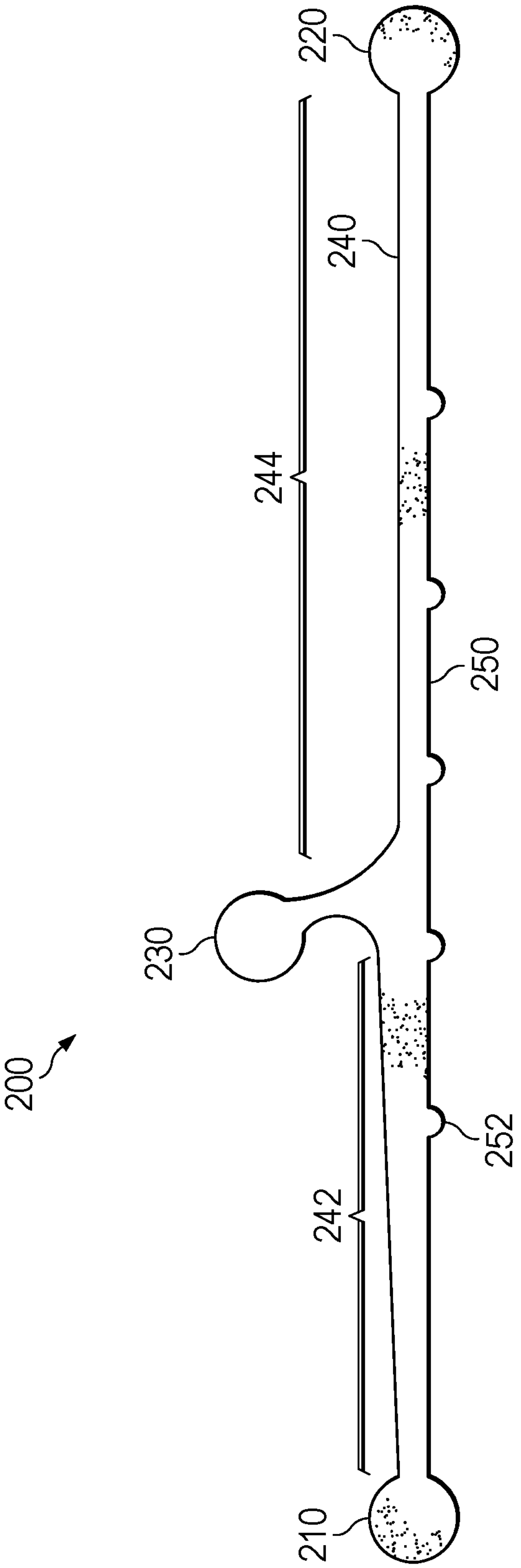
FIG. 2 is a side view of a flexible seal, according to aspects of the present disclosure.

FIG. 2 is a side view of a flexible seal 200, according to aspects of the present disclosure. The flexible seal 200 may extend along a lower portion or upper portion of the movable barrier 190. FIG. 2 may show a cross sectional shape or profile of the flexible seal 200. It is understood that the flexible seal 200 may be of any suitable length including a length equal to the width of the movable barrier 190.

The flexible seal 200 may include an inner surface 240 and an outer surface 250. The flexible seal 200 may additionally include one or more protrusions. For example, the flexible seal 200 may include a protrusion 210 at one end of the flexible seal 200 and a protrusion 220 at the other end of the flexible seal 200. In addition, a protrusion 230 may extend from the inner surface 240 at a location between the protrusion 210 and the protrusion 220. In some aspects, the protrusions 210, 230, and 220 may also be referred to as connectors, bulbous connectors, interlocking features, or any other suitable terms. As will be explained in more detail with reference to FIGS. 3-6, the protrusions 210, 230, and 220 may be received in corresponding grooves of the movable barrier 190.

The inner surface 240 may include a region 242 and a region 244. In some aspects, the protrusion 230 may separate the regions 242 and 244. In some aspects, a thickness of the flexible seal 200 may vary at different positions along the flexible seal 200. For example, a thickness of the flexible seal 200 along the region 242 may be greater than the thickness of the flexible seal 200 along the region 244. In some aspects, the thickness corresponding to the region 244 may be greater than the thickness corresponding to the region 242, or the thickness of the flexible seal 200 may be uniform all along the flexible seal 200. In some aspects, the thickness 200 may be gradually or continuously increased or decreased along the flexible seal 200. For example, the thickness of the flexible seal 200 may be a first thickness at or near the protrusion 210 and may increase toward the protrusion 230 as shown in FIG. 2. Any suitable thickness of the flexible seal 200 is contemplated and varying thicknesses of the flexible seal 200 may be selected based on the desired flexibility characteristics, sealing characteristics, strength characteristics or resistance to wear, or any other characteristics.

As additionally shown in FIG. 2, the outer surface 250 of the flexible seal 200 may include one or more ridges 252. In some aspects, the ridges 252 may be configured to contact surfaces adjacent to the movable barrier 190 and may increase the effectiveness of the flexible seal 200 in separating the interior from the exterior of the space corresponding to the movable barrier system 100 (FIG. 1). In some aspects, the flexible seal 200 may prevent air, liquid, pests, or anything else from passing through the movable barrier 190 as will be described in more detail with reference to FIG. 4.

It is noted that the flexible seal 200 referred to throughout the present disclosure may additionally be referred to as a flexible member, a flexible elongate member, an astragal seal, or by any other suitable term.

Figure 3B:
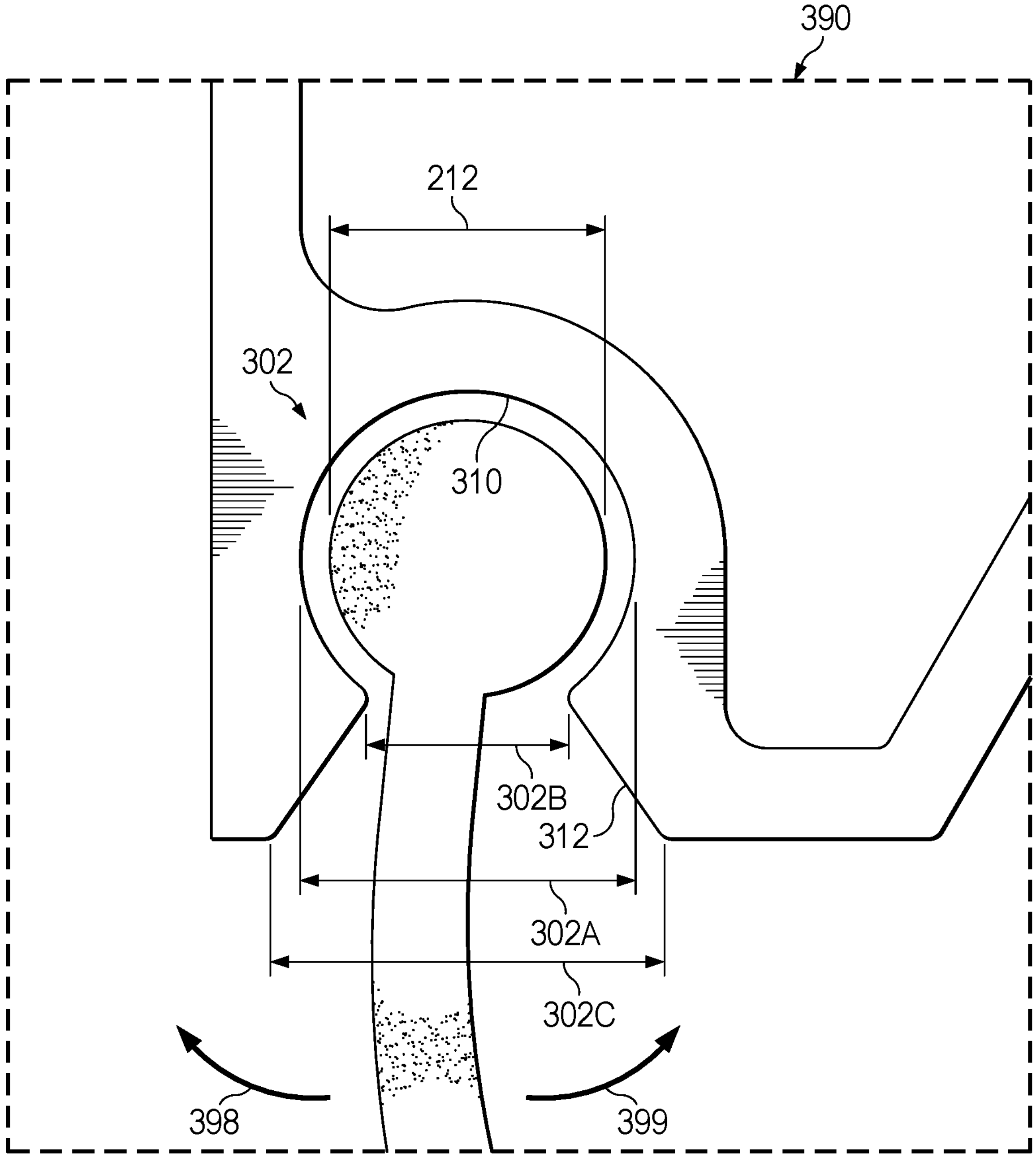
FIG. 3B is an exploded side view of a flexible seal affixed to a lower rail of a movable barrier, according to aspects of the present disclosure.

FIG. 3A is a side view of the flexible seal 200 affixed to a lower rail 300 of the movable barrier 190, according to aspects of the present disclosure. FIG. 3B is an exploded side view of a flexible seal affixed to a lower rail of a movable barrier, according to aspects of the present disclosure. FIGS. 3A and 3B will be described concurrently. FIG. 3A may illustrate the flexible seal 200 in an installed configuration along a lower edge 306 of the movable barrier 190. Referring to FIG. 1, the movable barrier 190 may include multiple rails extending horizontally along the movable barrier 190. The lower rail 300 defines the lower edge of the movable barrier 190.

An upward acting movable barrier, like the movable barrier 190, may include various seals around a perimeter of the movable barrier 190. In some aspects, such seals may be configured to close gaps between the movable barrier and an outside frame of the movable barrier. For example, the dimensions of a movable barrier, including a height and width, may be smaller than dimensions of the corresponding opening. This may ensure that the movable barrier may be moved into a closed position within the opening without obstruction. However, differences in the dimensions of the movable barrier and the corresponding opening create gaps which allow air to pass around the movable barrier into or out of the interior space. In this way, temperatures of the interior space (e.g., the space shown in FIG. 1) may more quickly increase or decrease to match temperatures of the exterior. The use of seals positioned along the perimeter of the movable barrier may help to prevent this movement of air around the movable barrier and temperatures of the interior may be more effectively maintained.

Along a lower edge of the movable barrier, a seal may be configured to contact the ground to prevent air from passing beneath the movable barrier in a closed position. Along an upper edge of the movable barrier, a seal may be configured to contact a wall or frame of the opening. Due to the different surfaces which the upper seal and the lower seal must contact to form a seal, a conventional upper seal and a conventional lower seal are typically two differently-shaped components, uniquely formed for their one specific application. More unique components of the movable barrier system 100 typically results in increased manufacturing, servicing, and/or inventory costs and complexity. In contrast, the flexible seal 200 described herein may be used to form a seal along a lower edge of the movable barrier 190 as well as an upper edge of the movable barrier 190. As such, the number of unique parts required to assemble the movable barrier system 100 is reduced and the manufacturing, servicing, and inventory costs and complexity are also reduced.

To form a seal along the lower edge of the movable barrier 190, or along the lower edge of the lower rail 300 of the movable barrier 190, as shown in FIG. 3A, the protrusion 210 may be positioned within a corresponding groove 302 and the protrusion 220 may be positioned within a corresponding groove of 304. The outer surface 250 may be positioned to face outward away from the lower edge 306 of the lower rail 300. The inner edge 240 may face inwardly toward the lower edge 306 of the lower rail 300. In such a configuration, the protrusion 230 may be concealed from view.

Alternatively, the surface 250 may be positioned to face inward toward the lower edge 306 of the lower rail 300. The edge 240 may face outwardly away from the lower edge 306 of the lower rail 300. In such a configuration, the protrusion 230 may provide a secondary sealing surface on the barrier floor.

FIG. 3A additionally includes a detailed view 390 shown in more detail in FIG. 3B. The view 390 of FIG. 3B shows an enlarged view of the protrusion 210 and the corresponding groove 302. As shown, the groove 302 may include an opening 312 and a receiving cavity or track 310. The receiving cavity or track may extend the length of the lower rail 300. As shown, the protrusion 210 may be positioned within the track 310 of the groove 302. In that regard, the track 310 may be of a cross-sectional shape which corresponds to the cross-sectional shape of the protrusion 210. In this way, a diameter 302A of the track 310 may correspond to a diameter 212 of the protrusion 210. For example, if the cross-sectional shape of the protrusion 210 is a circle, as shown in FIG. 3B, the cross-sectional shape of the track 310 may also be a circle. However, it is contemplated that the cross-sectional shape of the protrusion 210 and the corresponding track 310 may be any suitable shape. In some aspects, the diameter 302A of the track 310 may be larger than the diameter 212 of the protrusion 210. In this way, the protrusion 210 may be positioned within the track 310.

As additionally shown in FIG. 3B, the groove 302 may include the opening 312. In the particular implementation shown, the opening 312 may be defined by two angled or frustoconical surfaces. Due to these angled surfaces, the opening 312 may be of varying widths. For example, a width 302C may be defined by the lower region of the angled surfaces of the opening 312. The width 302B may be defined by an upper region of the angled surfaces of the opening 312. Due to the angled surfaces of the opening 312, the width 302B may be less than the width 302C.

In addition, the width 302B may be less than the diameter 212 of the protrusion 210. In this way, when the protrusion 210 is positioned within the track 310, because the with 302B is less than the diameter 212, the protrusion 210 may be prevented from being removed out of the track 310.

In some aspects, the protrusions 210 and 220 may be positioned within corresponding grooves 302 and 304 by laterally sliding the protrusions 210 and 220 into the grooves 302 and 304 at a left or right side of the movable barrier 190. The flexible seal 200 may then be slid into place in a direction parallel to the plane of the movable barrier 190.

In some aspects, the protrusions 210 and 220 may be positioned within the corresponding grooves 302 and 304 by snapping the protrusions 210 and 220 into place. In some aspects, the width 302C may be greater than the diameter 212 of the protrusion 210. in this regard, during an installation of the seal 200, the protrusion 210 may be placed within the opening 312. Because the width 302 C is greater than the diameter 212, the protrusion 210 may be aligned with the groove 302 during installation. An installer of the flexible seal 200 may urge the protrusion 210 toward the track 310. As the protrusion 210 is moved into the track 310, the protrusion 210 may be temporarily deformed during installation to allow the protrusion 210 to pass through the upper width 302B of the opening 312, snapping into place.

In some aspects, the angled surfaces of the opening 312 may additionally allow rotational movement of the protrusion 210. The angled surfaces of the opening 312 may also allow the end of the flexible seal 200 to which the protrusion 210 is affixed to move in the directions 398 and 399 shown. For example, as will be explained in greater detail with reference to FIG. 4, as the flexible seal 200 is deformed when it contacts the surface 117, the ends of the flexible seal 200 may be urged outward. In the expanded view 390 shown, the end of the flexible seal 200 may be urged in the direction 398. Because the protrusion 210 has a circular shape, and the corresponding track 310 has a circular shape, the protrusion 210 may be allowed to rotate within the track 310. In some aspects, this rotation of the protrusion 210 may increase the flexibility of the flexible seal 200 creating a more reliable seal between the flexible seal 200 and the surface 117.

The groove 304 may be substantially similar to the groove 302. For example, the groove 304 may include a track and an opening which secures the protrusion 220 in place within the group 304. As described with reference to the protrusion 210 in the corresponding groove 302, the protrusion 220 may be positioned within the groove 304 by sliding the protrusion 220 into the groove 304 at a left or right side of the groove 304 or by snapping the protrusion 220 in place.

Figure 4:
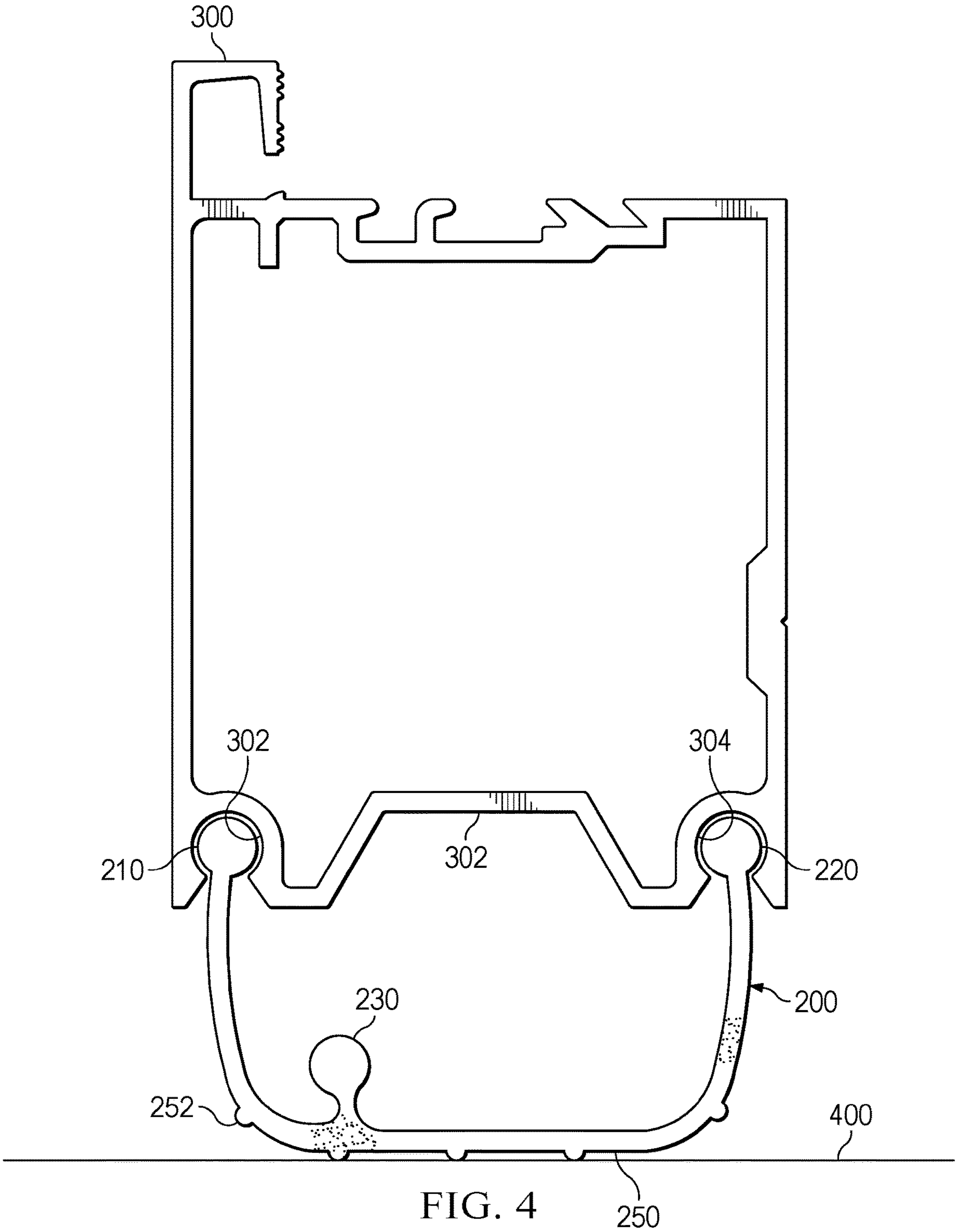
FIG. 4 is a side view of a flexible seal affixed to a lower rail of a movable barrier and deformed against a structure, according to aspects of the present disclosure.

FIG. 4 is a side view of the flexible seal 200 affixed to the 300 lower rail of the movable barrier 190 and deformed against a structure 400, according to aspects of the present disclosure.

FIG. 4 may illustrate a lower region of the movable barrier 190 in a closed position. In a closed position, the lowermost edge of movable barrier 190 may contact a structure 400. The structure 400 may be the floor or ground extending between sides of the frame of the movable barrier 190.

As shown in FIG. 4, because the flexible seal 200 is flexible, it may be deformed in a variety of shapes. For example, as the movable barrier 190 is moved such that the flexible seal 200 contacts the surface 117, a central region of the outer surface 250 of the flexible seal 200 may first contact the surface 117. As the weight of the movable barrier 190 begins to rest on be flexible seal 200 as the movable barrier 190 continues to move downward toward the surface 117, the flexible seal 200 may deform until the flexible seal 200 supports the weight of the mobile barrier 190. In such a configuration, a portion of the flexible seal 200 may deform in a flat configuration according to the shape of the surface 117. In this way, and as shown in FIG. 4, multiple ridges 252 may contact the surface 117. Due to the weight of the movable barrier 190, the ridges 252 may bear against the surface 117 forming a tight seal between the ridges 252 and the surface 117.

In some aspects, the position of the ridges 252 along the outer surface 250 of the flexible seal 200 may account for irregularities in the surface 117. For example, holes or ridges of the surface 117, as well as debris on the surface 117, may cause gaps between the flexible seal 200 and the surface 117. However, due to the ridges 252, if one ridge 252 is spaced from the surface 117 for any reason, another ridge 252 may contact the surface 117 and maintain the seal between the flexible seal 200 and the surface 117. Thus, the flexible seal 200 may create a reliable seal against surfaces of varying shapes, profiles or smoothness.

It is noted, that when the movable barrier 190 is moved from the closed position to the open position, such that the flexible seal 200 no longer contacts the surface 117, the flexible seal 200 may return to the shape shown and described with reference to FIG. 3A. In aspects in which the protrusion 230 is mounted outwardly, the deformed shape of the seal 200 may appear differently.

FIG. 5 is a side view of the flexible seal 200 affixed to an upper rail 500 of the movable barrier 190, according to aspects of the present disclosure. The same flexible seal 200 shown and described with reference to FIGS. 3 and 4 may be affixed to an upper edge of the upper rail 500 of movable barrier 190.

In the configuration shown in FIG. 5, the protrusion 230 may be positioned within a corresponding groove 502 of the upper edge 502 of the upper rail 500. The protrusion 220 may be positioned within the corresponding groove 504 along the upper edge 502 of the upper rail 500. In such a configuration, the region 242 of the flexible seal 200 may extend outward perpendicular to the movable barrier 190.

In some aspects, the protrusion 230 and corresponding groove 502, as well as the protrusion 220 and the corresponding groove 504, include any characteristics or attributes similar to those described with reference to the protrusion 210 and the groove 302 of FIGS. 3A and 3B. For example, the grooves 502 and 504 may include tracks and openings of varying widths which allow the protrusions 230 and 220 to be slid or snapped into place, as well as allowing for rotation of the protrusions 230 and 220 and retaining the protrusions 230 and 220 within the grooves 502 and 504.

In the configuration shown in FIG. 5, the outer surface 250 of the flexible seal 200 may face outward and upward from the upper rail 500. Region 244 of the inner surface 240 may face inwards toward the upper edge 502 of the upper rail 500. The region 242 of the inner surface 240 may face downward. In some aspects, the protrusion 210 and the region 242 of the flexible seal 200 may extend toward the exterior of the movable barrier 190. The configuration shown in FIG. 5 may correspond to a configuration of the flexible seal 200 while the movable barrier 190 is in an open position. The configuration shown and described with reference to FIG. 6 below may correspond to a configuration of the flexible seal 200 while the movable barrier 190 is in a closed position.

Figure 6:
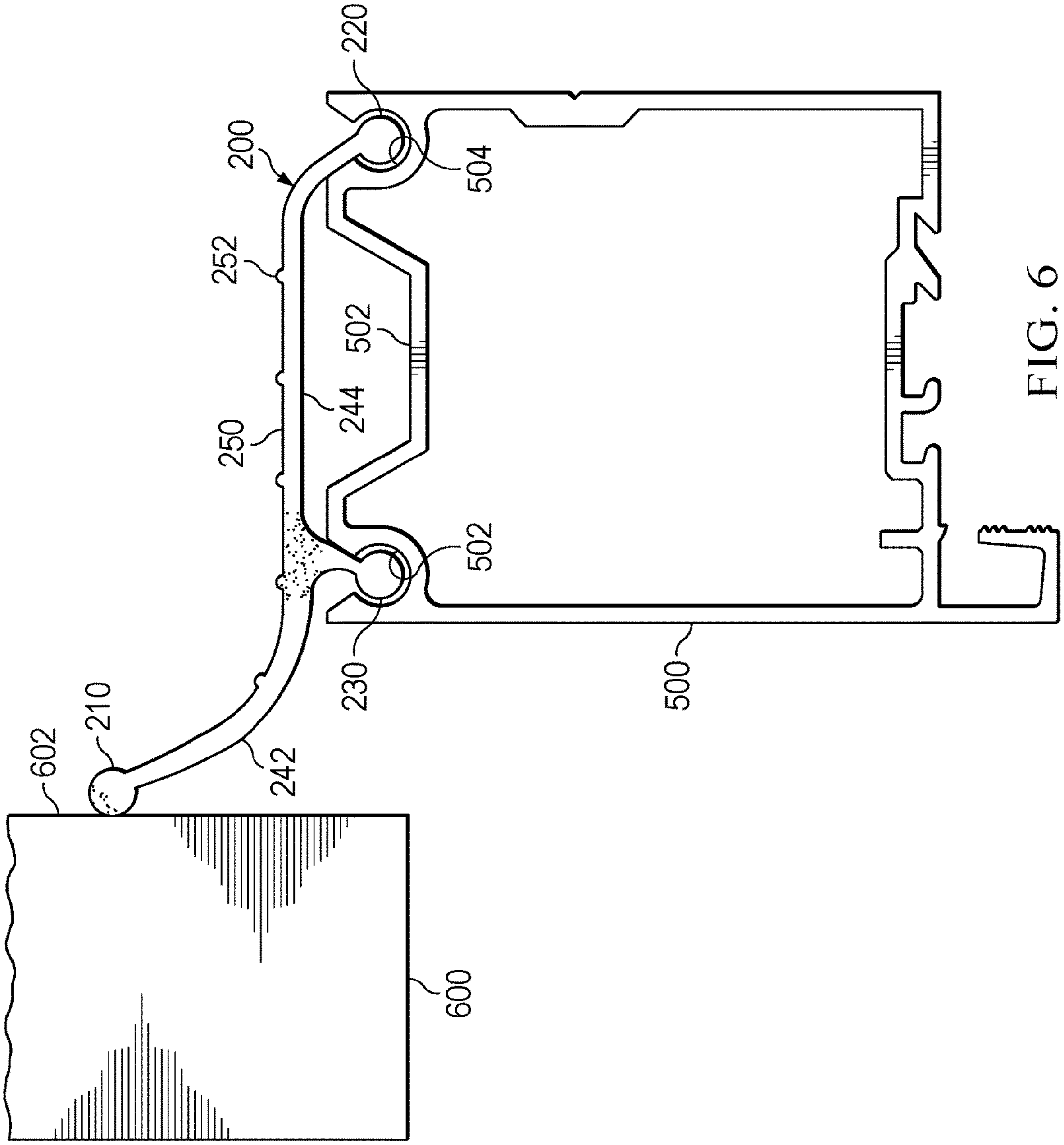
FIG. 6 is a side view of a flexible seal affixed to an upper rail of a movable barrier and deformed against a structure, according to aspects of the present disclosure.

FIG. 6 is a side view of the flexible seal 200 affixed to an upper rail 500 of the movable barrier 190 and deformed against a structure 600, according to aspects of the present disclosure.

FIG. 6 may illustrate an upper region of the movable barrier 190 in a closed position. In a closed position, the uppermost edge of movable barrier 190 may contact a structure 600. The structure 600 may be the wall or frame of the movable barrier 190 extending along the perimeter of the movable barrier 190 at the top and side edges.

As described with reference to FIG. 4, the flexible seal 200 may be deformed in a variety of shapes. In the example shown in FIG. 6, as the movable barrier 190 is moved to a closed position, the flexible seal 200 contacts the surface 600. As the movable barrier 190 is moved to a closed position, the top edge 502 of the movable barrier 190 may be moved in a downward direction as well as in a direction toward the exterior of the moveable barrier system 100. This downward and side movement of the movable barrier 190 may be due to the curved regions of the tracks 140 (FIG. 1). As the movable barrier 190 approaches the closed position, the protrusion 210 may first contact the interior-facing surface 602 of the structure 600. The protrusion 210 may then move or slide along the interior-facing surface 602 and the region 242, as well as any other regions of the flexible seal 200, may deform as shown in FIG. 6. In some aspects, the flexible seal 200 may resist deformation. In this way, the flexible seal 200 in the deformed orientation shown in FIG. 6 may provide a force bearing against the interior-facing surface 602. This bearing force forms a tight seal between the protrusion 210 and the interior-facing surface 602 all along the upper edge of the movable barrier.

It is noted, that when the movable barrier 190 is moved from the closed position to the open position, such that the flexible seal 200 no longer contacts the surface 117, the flexible seal 200 may return to the shape shown and described with reference to FIG. 5.

It is also noted, that although the cross-sectional shapes of the protrusions 210, 230, and 220 shown throughout are circular, the cross-sectional shapes of these protrusions may be of any suitable shape. in addition, the corresponding grooves 302, 304, 502, and/or 504 may be of any suitable shape.

In that regard, the cross-sectional shapes of the protrusions and corresponding grooves may be different from one another to assist an installer of the flexible seals in positioning the correct protrusions in the correct grooves depending on whether the flexible seal is positioned along the upper or lower edge of the movable barrier. For example, in one aspect, the grooves 304 and 504 may be of a similar cross-sectional shape. This may be because both of the grooves 304 and 504 are sized and shaped to receive the same protrusion 220. However, because groove 302 is configured to receive the protrusions 210 only and the groove 502 is configured to receive the protrusion 230 only, the protrusion 230 and the protrusion 210 may be sized and shaped differently from one another. For example, the protrusion 230 may be of a cross-sectional shape of a square, or a circle of a larger or smaller diameter to the protrusion 210. The corresponding groove 502 may be sized and shaped accordingly. In this way, if an installer tried to position the protrusion 210 incorrectly within the groove 502, the mismatch of cross-sectional shapes of the protrusion 210 and the groove 502 would prevent the installer from doing so. This would signal to the installer that the protrusions 230 should be positioned within the groove 502. In this way, varying cross-section shapes of the protrusions 210 and 230 specifically may assist an installer in correctly installing the flexible seals in the correct orientation depending on the flexible seals being affixed to the upper or lower edges of the movable barrier 190.

Figure 7A:
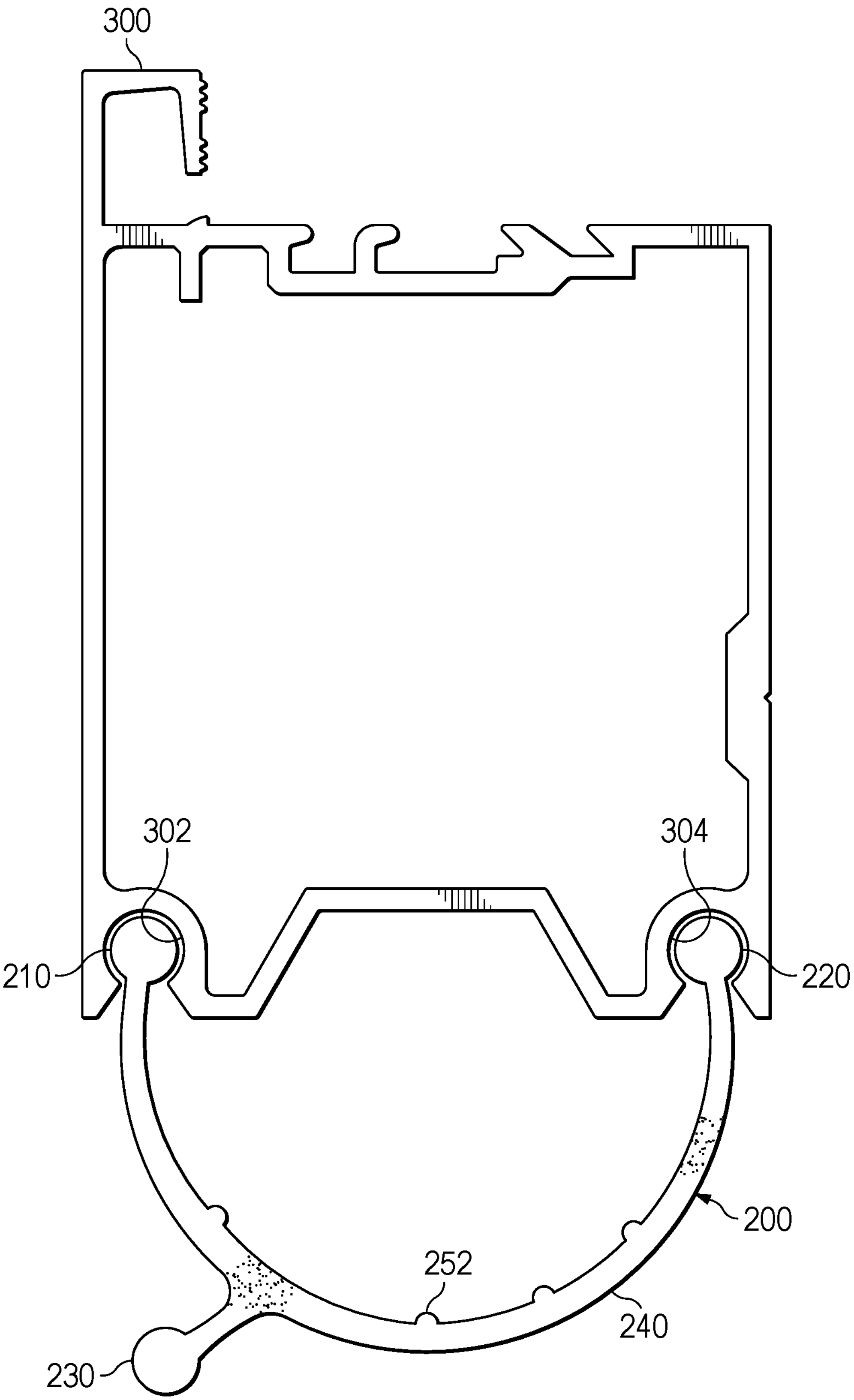
FIG. 7A is a side view of a flexible seal affixed to a lower rail of a movable barrier, according to aspects of the present disclosure.

FIG. 7A is a side view of the flexible seal 200 affixed to a lower rail 300 of a movable barrier, according to aspects of the present disclosure. As shown in FIG. 7A, in some aspects, the seal 200 may be oriented in an alternative orientation such that the protrusion 230 extends outward from the lower surface of the movable barrier. For example, the seal 200 may be reversed such that the surface 240 including the protrusion 230 extends outward as opposed to facing the lower surface of the movable barrier as shown in FIG. 3A. Similarly, the surface 250, including the ridges 252, may be positioned to face the lower surface of the movable barrier. In that regard, as shown in FIG. 7A, the protrusion 210 may similarly be positioned within the groove 302 protrusion 220 may be position within the groove 304.

Figure 7B:
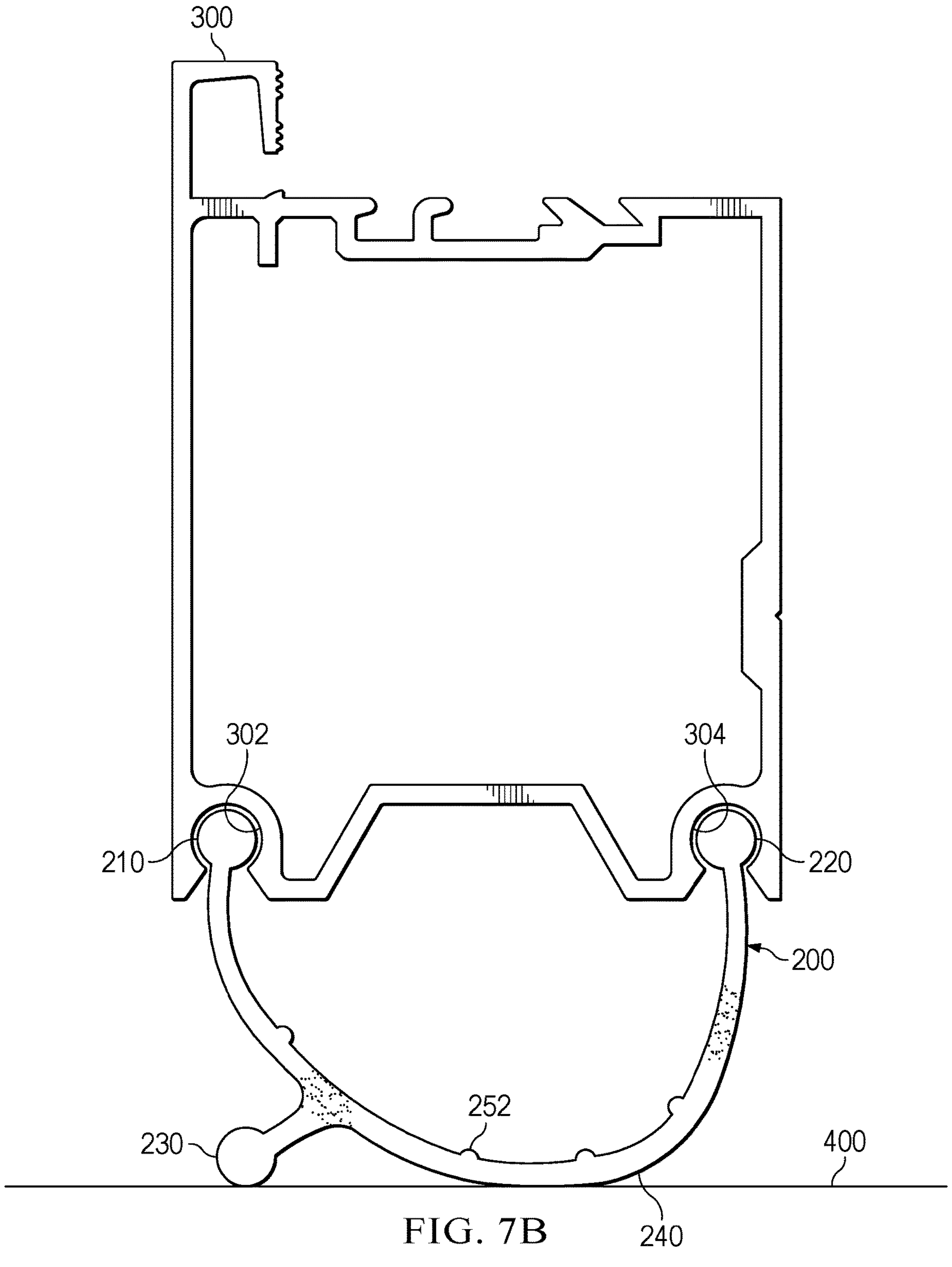
FIG. 7B is a side view of a flexible seal affixed to a lower rail of a movable barrier and deformed against a structure, according to aspects of the present disclosure.

FIG. 7B is a side view of the flexible seal 200 affixed to a lower rail 300 of a movable barrier and deformed against a structure 400, according to aspects of the present disclosure. Like FIG. 4 described previously, FIG. 7B may illustrate a shape of the seal 200 as it contacts the structure 400. As shown in FIG. 7B, the seal 200 may contact the structure 400 at at least two points. For example, a point of the surface 240 may contact the structure 400 at one location, and the protrusion 230 may also contact the structure 400 at a different location. As a result, the seal between the movable barrier and the structure 400 may be improved. For example, if the seal formed by the surface 240 with the structure 400 is compromised, the seal formed by the protrusion 230 and the structure 400 may serve to maintain a seal between the movable barrier and the structure 400. As a result, the orientation of the seal 200 shown in FIG. 7B may advantageously provide multiple seal points.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A flexible seal for a movable barrier, comprising:
- a first end, a second end, and a central region extending between the first end and the second end, the central region comprising a first surface and an opposite second surface; and
- a set of protrusions, comprising:
  - a first protrusion at the first end;
  - a second protrusion at the second end; and
  - a third protrusion extending from the first surface of the central region,
- wherein the flexible seal is affixable to a lower edge of the movable barrier using a first subset of the set of protrusions to seal along the lower edge of the movable barrier, and
- wherein the flexible seal is affixable to an upper edge of the movable barrier using a second subset of the set of protrusions different from the first subset to seal along the upper edge of the movable barrier.

2. The flexible seal of claim 1, wherein, when the flexible seal is in a first configuration, the first protrusion is receivable within a first groove of the lower edge of the movable barrier and the second protrusion is receivable within a second groove of the lower edge of the movable barrier.

3. The flexible seal of claim 2, wherein, when the flexible seal is in the first configuration, the flexible seal forms an arc.

4. The flexible seal of claim 2, wherein, when the flexible seal is in the first configuration, the second surface of the flexible seal faces outward and the first surface and third protrusion face inward toward the lower edge of the movable barrier.

5. The flexible seal of claim 2, wherein, when the flexible seal is in the first configuration, the second surface contacts a structure to seal along the lower edge of the movable barrier.

6. The flexible seal of claim 1, wherein, when the flexible seal is in a second configuration, the second protrusion is receivable within a first groove of the upper edge of the movable barrier and the third protrusion is receivable within a second groove of the upper edge of the movable barrier.

7. The flexible seal of claim 6, wherein, when the flexible seal is in the second configuration, the first protrusion extends outward in a transverse direction from the movable barrier.

8. The flexible seal of claim 6, wherein, when the flexible seal is in the second configuration, the second surface is exposed outward, a first portion of the first surface between the second protrusion and the third protrusion faces inward toward the upper edge of the movable barrier, and a second portion of the first surface between the first protrusion and the third protrusion is exposed.

9. The flexible seal of claim 8, wherein, when the flexible seal is in the second configuration, the second portion of the first surface is configured to contact a structure to seal along the upper edge of the movable barrier.

10. The seal of claim 1, wherein a thickness of the flexible seal between the first protrusion and the third protrusion is greater than a thickness of the flexible seal between the third protrusion and the second protrusion.

11. A flexible seal for a movable barrier, comprising:

a first end, a second end, and a central region extending between the first end and the second end, the central region comprising a first surface and an opposite second surface;

a first protrusion at the first end;

a second protrusion at the second end; and a third protrusion extending from the first surface of the central region, wherein the flexible seal is structurally arranged for use in a first configuration and a second configuration such that:

when the flexible seal is in the first configuration, the flexible seal is configured to be affixed to a lower edge of the movable barrier such that the first protrusion is received within a first groove of the lower edge, the second protrusion is received within a second groove of the lower edge, and the second surface contacts and seals along a lower surface; and when the flexible seal is in the second configuration, the flexible seal is configured to be affixed to an upper edge of the movable barrier such that, the second protrusion is received within a first groove of the upper edge of the movable barrier, the third protrusion is received within a second groove of the upper edge of the movable barrier, and the first protrusion contacts and seals along an upper surface.

* * * * *